(12) United States Patent
Smith

(10) Patent No.: US 9,934,548 B2
(45) Date of Patent: Apr. 3, 2018

(54) HIERARCHICAL TECHNIQUES FOR STORING GRAPHICS PRIMITIVES

(71) Applicant: Apple Inc., Cupertino, CA (US)

(72) Inventor: Jacob N. Smith, Spicewood, TX (US)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 15/065,675

(22) Filed: Mar. 9, 2016

(65) Prior Publication Data

US 2017/0262951 A1   Sep. 14, 2017

(51) Int. Cl.
  *G06T 15/30*   (2011.01)
  *G06T 1/20*    (2006.01)
  *G06T 15/00*   (2011.01)

(52) U.S. Cl.
  CPC .............. *G06T 1/20* (2013.01); *G06T 15/005* (2013.01)

(58) Field of Classification Search
  CPC ....... G06T 2207/20016; G06T 2200/08; G06T 2210/36; G06T 2210/61; G09G 2360/122
  See application file for complete search history.

(56) References Cited

U.S. PATENT DOCUMENTS

| | | | |
|---|---|---|---|
| 7,589,722 | B2 | 9/2009 | Morein |
| 2007/0146378 | A1 | 6/2007 | Sorgard et al. |
| 2014/0267256 | A1 | 9/2014 | Heggelund et al. |
| 2015/0348306 | A1 | 12/2015 | Yang et al. |
| 2015/0363969 | A1 | 12/2015 | Yang |

*Primary Examiner* — Hau Nguyen
(74) *Attorney, Agent, or Firm* — Meyertons, Hood, Kivlin, Kowert & Goetzel, P.C.

(57) ABSTRACT

Techniques are disclosed relating to storing primitive information for tile-based graphics rendering. In some embodiments, primitive information is stored using hierarchically arranged bins. In some embodiments, information for a given primitive may be stored at multiple levels in the hierarchy. For example, in some embodiments a graphics processor is configured to store primitive information for a primitive in a particular bin if the primitive (1) completely covers the area in screen space corresponding to the particular bin and (2) the primitive is not listed in any bins that correspond to a larger area that includes the area corresponding to the particular bin. This may reduce memory requirements because the memory needed for each primitive may be proportional to the width (or height) of the primitive multiplied by the log of the width (or height), rather than the area of the primitive.

20 Claims, 6 Drawing Sheets

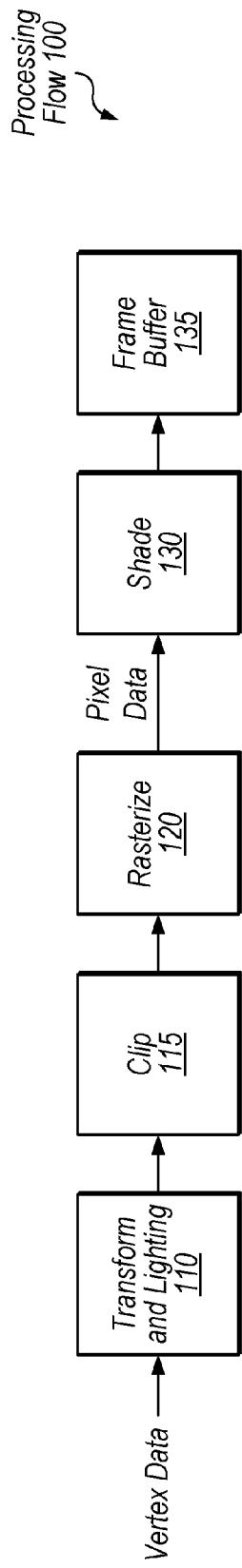
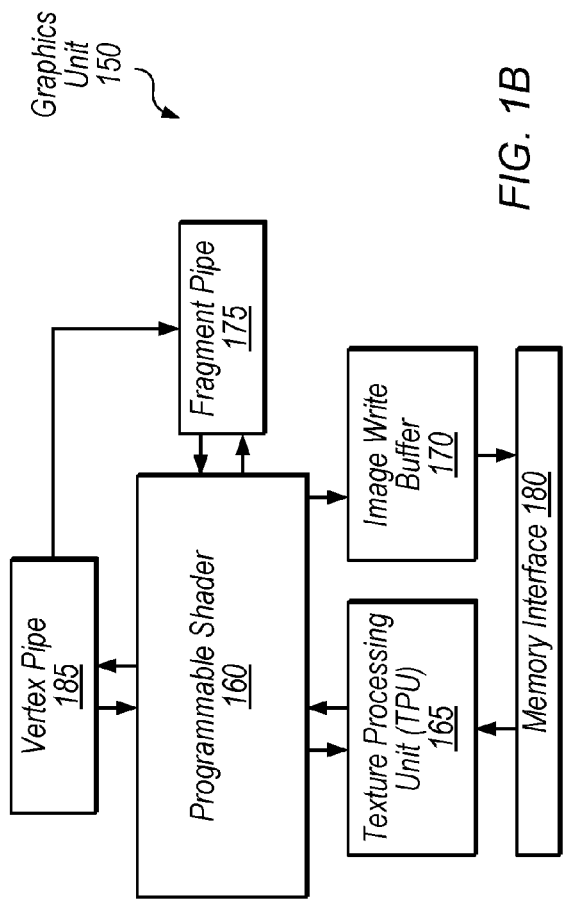

Primitive identifiers 480 (primitive with lower IDs retrieved first, as specified by graphics program):

| Primitive | ID |
|---|---|
| A | 1234 |
| B | 2234 |
| C | 2486 |
| D | 7432 |
| E | 7711 |
| F | 8490 |

Bin Status 482:
Primitives in bin 0: B -> E
Primitives in bin 1: empty
Primitives in bin 2: E
Primitives in bin 3: F
Primitives in bin 4: A -> D

HIERARCHICAL TECHNIQUES FOR STORING GRAPHICS PRIMITIVES

BACKGROUND

Technical Field

This disclosure relates generally to graphics processing and more specifically to storing primitive information for tile-based rendering.

Description of the Related Art

Tile-based deferred rendering (TBDR) is a graphics processing technique in which a frame of graphics data to be rendered is divided into a grid of tiles in screen space for separate processing. Tiles often correspond to 16×16 or 32×32 squares of pixels, for example, but can vary in size in different implementations. Separately processing tiles may be advantageous because of spatial coherence and/or when hardware rendering resources are limited. Initially, primitives are transformed into screen space and assigned to tiles. This may require storing lists of primitives corresponding to each tile.

Tiles are then separately rendered (typically using parallel rendering hardware) and eventually written to an image buffer. When rendering a tile, the rendering hardware typically reads the list of primitives for the tile being rendered in order to rasterize the primitives (to determine pixel attributes based on the primitives).

For relatively large primitives, the memory requirements for storing an identification of the primitive for each tile that it intersects may be substantial. Some conventional techniques may reduce these memory requirements, but require additional processing when reading the primitive lists for rendering.

SUMMARY

Techniques are disclosed relating to storing primitive information for tile-based graphics rendering. In some embodiments, primitive information is stored using hierarchically arranged bins. In some embodiments, information for a given primitive may be stored at multiple levels in the hierarchy. For example, in some embodiments a graphics processor is configured to store primitive information for a primitive in a particular bin if the primitive (1) completely covers the area in screen space corresponding to the particular bin and (2) the primitive is not listed in any bins that correspond to a larger area that includes the area corresponding to the particular bin. This may reduce memory requirements because the memory needed for each primitive may be proportional to the width (or height) of the primitive multiplied by the log of the width (or height), rather than the area of the primitive. In some embodiments, traversal of primitives during rasterization may remain proportional to the number of primitives that intersect a given tile.

For example, when accessing primitive information for a given tile, the graphics processor may be configured to search through all bins in the hierarchy whose corresponding area of the screen space includes the particular tile. The graphics processor may iteratively select the primitive with the lowest primitive ID from these bins in order to maintain primitive ordering.

In some embodiments, the number of levels in the hierarchy is based on a configurable parameter.

BRIEF DESCRIPTION OF THE DRAWINGS

FIG. 1A is a block diagram illustrating an exemplary graphics processing flow, according to some embodiments.

FIG. 1B is a block diagram illustrating one embodiment of a graphics unit, according to some embodiments.

Figure 2:
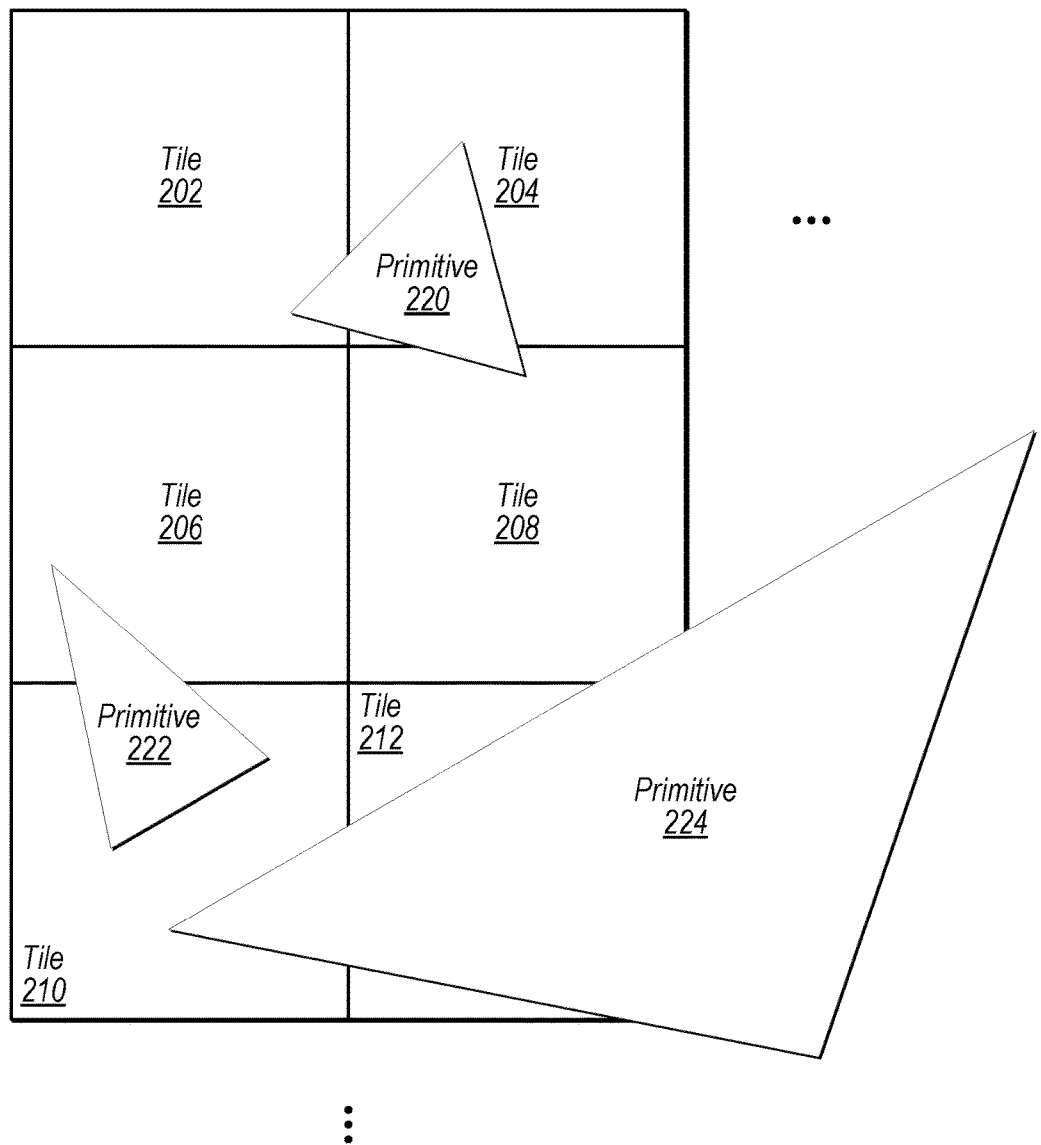
FIG. 2 is a diagram illustrating exemplary intersection of tiles by primitives in screen space, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. §112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

This disclosure initially describes, with reference to FIGS. 1A-1B, an overview of a graphics processing flow and an exemplary graphics unit. Embodiments of hierarchical binning techniques for primitive storage and retrieval are discussed with reference to FIGS. 2-5. FIG. 6 illustrates an exemplary device. In various embodiments, the disclosed techniques may reduce memory and/or processing requirements for rasterizing primitives, for example.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write buffer 170, memory interface 180, and texture state cache 190. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

Tile-Based Rendering Overview

FIG. 2 illustrates exemplary primitives that intersect tiles in a portion of a screen space, according to some embodiments. In the illustrated embodiment, primitive 220 intersects tiles 202, 204, and 208; primitive 222 intersects tiles 206 and 210; and primitive 224 intersects tiles 208, 210, and 212 (among other tiles not shown). When rendering each tile, graphics unit 150 may need to consider each primitive that intersects the tile. For example, during rasterization of tile 210, graphics unit 150 may utilize information for both primitive 222 and primitive 224, but not primitive 220.

Typically, the positions of objects and primitives in a scene are initially determined in a three-dimensional space, which may be referred to as a world space. Graphics rendering includes transforming primitives from the three-dimensional space into a two-dimensional "screen space" for display. As used herein, the term "screen space" is intended to be interpreted according to its well-understood meaning in the art, which includes a two-dimensional coordinate system with points that correspond, or are mapped to, pixels on a display. Rasterization may include determining pixel attributes (e.g., colors) based on primitives that intersect the pixels in screen space. Attributes for pixels in screen space may be determined and stored in a buffer until they are ready for display In some implementations, a graphics unit stores a list for each tile of primitives that intersect the tile. In these implementations, traversing the primitives per tile is proportional in cost to the number of primitives that cover the tile. Storing lists of primitives that intersect each tile, however, may require memory space that is proportional to the area of the primitive. This can consume available video graphics memory quickly if several large primitives are encountered in a scene. Therefore, in some embodiments, more efficient storage techniques are used.

Note that triangular primitives are discussed herein for purposes of illustration, but any of various appropriate other primitives may be used in other embodiments, including quadrilaterals, etc.

Exemplary Hierarchical Linkless Tiling Techniques

Figure 3:
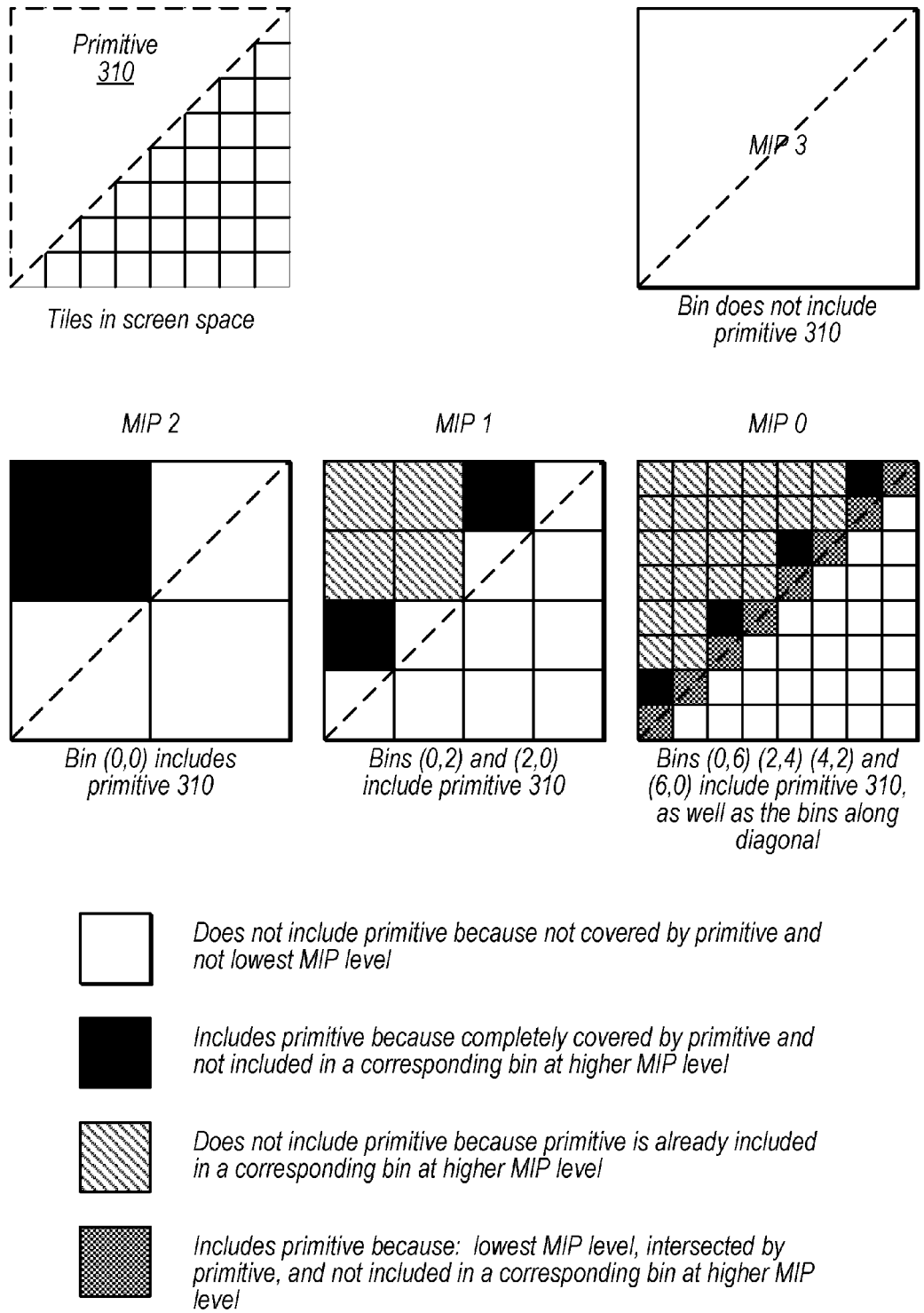
FIG. 3 is a diagram illustrating hierarchical binning a primitive, according to some embodiments.

FIG. 3 illustrates exemplary techniques for storing information indicating which primitives intersect each tile, according to some embodiments. In the illustrated embodiment, triangular primitive 310 falls in the upper left hand portion of the illustrated tiles in screen space.

In the illustrated embodiment, data sets (also referred to herein as "data bins" or "bins") corresponding to increasingly larger areas of screen space are defined and used to store primitive information. The primitive information may include, for each primitive, a primitive identifier, vertex information, plane information, etc. The primitive identifier may be used to track a rasterization order (e.g., lower primitives IDs should be rasterized first, in some embodiments). Each primitive may thus require proportionally large amounts of data, for example, and storing information for a given primitive as few times as possible may be desirable to reduce memory requirements. The state of the bins in FIG. 3 is shown after graphics unit 150 has finished listing primitive 310 in the appropriate bins, according to some embodiments. In some embodiments, graphics unit 150 is configured to perform similar operations for each primitive in a scene being rendered.

Because the illustrated techniques are similar to mipmapping, the different bin levels in the hierarchy are referred to herein as MIP levels. In the illustrated embodiments, there are four MIP levels 0-3. In other embodiments, any of various appropriate numbers of levels may be implemented. In the illustrated embodiment, the highest MIP level (MIP 3) corresponds to the entire screen space, bins in the next MIP level (MIP 2) each correspond to ¼ of the screen space, and so on, with bins in each level of the hierarchy one fourth of the size of the next highest level.

In the illustrated embodiment, the tiles in the screen space (which graphics unit 150 is configured to separately render, in some embodiments) correspond in size to the portion of the screen space for bins in the lowest level of the hierarchy (MIP 0). In other embodiments, the tiles may correspond to bins at another level in the hierarchy, or may not correspond in size to bins at any level in the hierarchy.

In some embodiments, graphics unit 150 is configured to store information for a primitive in a particular bin in MIP levels 1-N (where N is an integer) if the primitive meets the following requirements:

(1) the primitive completely covers the area in screen space corresponding to the particular bin and
(2) the primitive is not listed in any bins that correspond to a larger area that includes the area corresponding to the particular bin.

In some embodiments, for the lowest level in the hierarchy (MIP level 0 in the illustrated embodiment), requirement (1) above is relaxed and primitives are listed if they intersect the area corresponding to the particular bin at all, assuming the primitives also meet requirement (2) above. This may ensure that every primitive is listed in at least one bin. In embodiments in which the lowest MIP level corresponds to a single pixel, requirements (1) and (2) may be enforced for every level in the hierarchy, including the lowest level. In other embodiments, however, the bins at the lowest level may correspond to blocks of pixels such as 16×16 pixels, 32×32 pixels, etc. and requirement (1) may be relaxed. Speaking generally, the areas in screen space corresponding to bins at different levels may range from a single pixel to the entire screen space, or may be restricted to a subset of this range, in various embodiments. Further a "portion" of a screen space may refer to a subset of the screen space or the entirety of the screen space.

In the illustrated embodiment, an (x,y) coordinate scheme is used to label bins in units of bins. Therefore, at MIP 2, for example, the upper left bin is (0,0) and the upper right bin is (1,0). As another example, the upper rightmost bin of MIP 0 is bin (7,0) and the lower leftmost bin of MIP 0 is (0,7).

For MIP 3, in the illustrated embodiment, primitive 310 is not listed because, although it intersects the single bin in MIP 3, it does not completely cover this bin and therefore does not meet requirement (1) above.

For MIP 2 in the illustrated embodiment, the upper left bin (0,0) is shaded black to indicate that graphics unit 150 is configured to store information for primitive 310 in this bin. Bin (0,0) lists primitive 310 because it completely covers the area corresponding to this bin and primitive 310 is not listed in any bins that correspond to a larger area that includes the area corresponding to the particular bin in a corresponding bin in a higher level in the hierarchy (primitive 310 is not listed in MIP 3).

Similarly, at MIP 1 in the illustrated embodiment, graphics unit 150 lists primitive 310 in the two bins shaded black (at bin coordinates (0,2) and (2,0)) because they are completely covered by primitive 310 and because the larger corresponding bins in MIP 2 and MIP 3 do not include primitive 310. The upper-left four bins in MIP 1, however, are diagonally shaded to indicate that they do not list primitive 310. This is because they fail requirement (2) above because primitive 310 is already listed in the larger corresponding bin (0,0) of MIP 2.

At MIP 0, in the illustrated embodiment, bins (0,6) (2,4) (4,2) and (6,0) include primitive 100 because they meet requirements (1) and (2) while the diagonally shaded bins do not include primitive 100 because they fail requirement (2). Further, the bins along the diagonal from bin (7,0) to bin (0,7) also include primitive 130 because MIP 0 is the lowest level in the hierarchy, the primitive intersects those bins, and the bins meet requirement (2) above.

The disclosed techniques may allow for efficient storage of primitives with little increase in processing requirements when accessing the lists. For example, in embodiments discussed below, traversal of primitives when rasterizing a tile may remain proportional to the number of primitives that cover the tile.

Further, the disclosed techniques may require memory space that is proportional to the width (or height) of the primitive multiplied by the log of the width (or height). This may significantly reduce memory requirements for large tiles in various situations, relative to implementations that use an amount of memory that is proportional to the area of the primitive. For example, consider an implementation in which hierarchical bins are used and a given primitive is listed in bins at only one level in the hierarchy. In such a case, memory usage may be fractionally reduced, but it is still proportional to the area of the primitive. Therefore, listing a given primitive at multiple different hierarchical levels, as disclosed herein, may be advantageous in various embodiments.

Exemplary Retrieval Techniques

In tile-based rendering techniques, primitives are typically be retrieved for a given tile when processing that tile, in order to determine pixel attributes for pixels in the tile. This process is typically referred to as rasterization. Thus, when processing a given tile, primitives that intersect the tile are considered, while other primitives do not need to be retrieved.

In the illustrated hierarchical binning techniques, rasterization circuitry may consider a set of bins that includes bins at multiple levels in the hierarchy when processing a given tile. For example, referring again to FIG. 3, when processing a tile corresponding to bin (3,3) at MIP 0, rasterization circuitry may look for primitives in bin (3,3) for MIP 0, bin (1,1) for MIP 1, bin (0,0) for MIP 2, and the single bin for MIP 3. This is the set of bins whose corresponding portion of the screen space overlaps the tile. In some embodiments, the rasterizing circuitry is configured not to search other bins when rasterizing this tile. In some embodiments, the processing resources needed for this traversal remains proportional to the number of primitives that cover the tile.

In some embodiments, when processing a given tile, rendering circuitry is configured to iteratively examine primitive identifiers from among all of the remaining primitives in the relevant set of bins and retrieve a primitive with the lowest primitive identifier from among the bins, for example, until no more primitives remain. This may preserve primitive ordering, in some embodiments.

Figure 4:
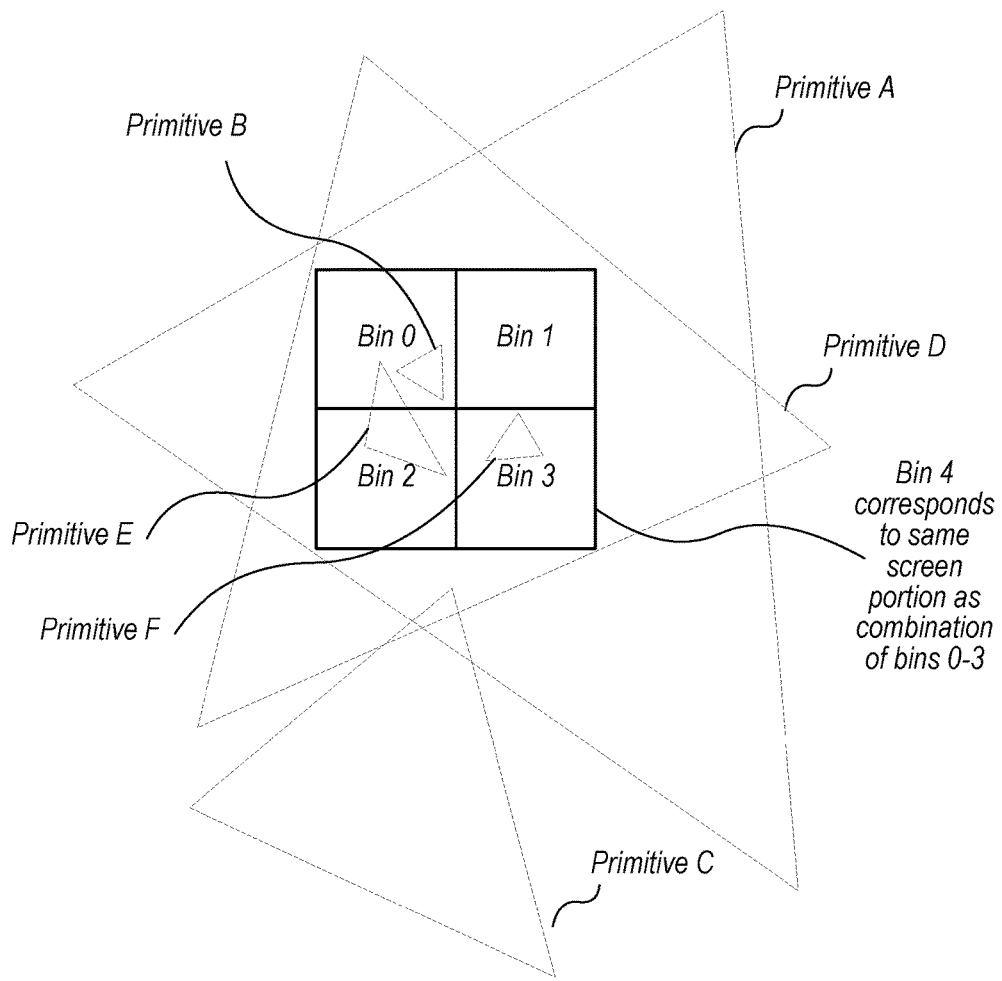
FIG. 4 is a diagram illustrating exemplary primitive retrieval from a hierarchical arrangement of bins, according to some embodiments.

FIG. 4 illustrates an exemplary set of bins and corresponding primitives to facilitate explanation of primitive retrieval, according to some embodiments. In the illustrated embodiment, bin 4 is at a higher level in the hierarchy than bins 0-3 and corresponds to the area in screen space corresponding to the combination of bins 0-3. In the illustrated embodiment, primitive identifiers 480 are associated with each primitive (e.g., primitive A's identifier is 1234) and the primitive identifiers are used to maintain primitive ordering, e.g., as specified by a graphics program. Thus, in the illustrated embodiment, primitives are to be processed in the following order, based on their identifiers: A, B, C, D, E, then F. Note that some primitives may be skipped if they do not intersect a pixel or screen portion being rasterized, for example.

In the illustrated embodiment, bin status information 482 shows which primitives are listed for each bin. In the illustrated embodiment, bin 4 lists primitives A and D because those primitives completely cover bin 4's area and are not listed in a higher level bin (higher level bins are not considered in this example to simplify explanation). In the illustrated embodiment, bin 0 lists primitives B and E. (In this example, bins 0-3 are in the lowest level in the hierarchy and thus list intersecting primitives, even if the primitives do not completely cover the corresponding screen space). Bin 0 does not list primitives A and D because they are already listed in a bin in a higher level that covers the corresponding area (bin 4). The arrow from primitive B to primitive E indicates that these primitives are stored using a linked list data structure in the illustrated embodiment, but any of various other appropriate data structures may be used in other embodiments.

In the illustrated embodiment, bin 1 is empty, bin 2 lists primitive E, and bin 3 lists primitive F. In the illustrated embodiment, primitive C is not listed in any of the illustrated bins (but may be listed in other bins, not shown).

Consider, for example, rasterizing a tile corresponding to bin 0 in screen space. When rasterizing this tile, in some embodiments the graphics unit is configured to search for primitives in bin 0 and bin 4 (as well as potentially other bins in higher levels, which are not considered in this example to simplify illustration). To determine which bins to consider for a given tile, in some embodiments an indexing scheme is used to determine relevant bins. For a given bin (x,y) at a given level in the hierarchy, the larger covering bin in the next highest level in the hierarchy may be bin (xh,yh) where xh=x divided by two and rounded down to the nearest integer and yh=y divided by two and rounded down to the nearest integer. In other embodiments, any of various appropriate techniques may be used to determine the set of bins that have corresponding areas that cover (or overlap) a tile being processed.

Graphics unit 150, in the illustrated embodiment, is configured to maintain a pointer to the remaining primitive with the lowest primitive ID for each bin in the set of relevant bins. For example, when beginning the rasterization process for the tile corresponding to bin 0, graphics unit may maintain a pointer *B to primitive B for bin 1 and a pointer *A to primitive A for bin 4. Graphics unit 150 is configured to read the first primitive from among the relevant bins in retrieval order (e.g., based on primitive ID) and thus reads primitive A from bin 4 for rasterization (based in its primitive ID being lower than primitive B's primitive ID) in this example.

Subsequent to rasterizing primitive A, the pointer for bin 1 still points to *B and the pointer for bin 4 is moved to *D. Graphics unit 150 then rasterizes primitive B, in this example, and moves the pointer for bin 1 to *E. Graphics unit 150 then rasterizes primitive D, in this example and bin 4 is then empty. Graphics unit 150 then rasterizes primitive E, and all primitives for the tile corresponding to bin 0 have been rasterized, for this example. As shown, the processing for the illustrated embodiment remains proportional to the number of primitives covering a given tile. Further, the amount of storage needed for pointers during processing is relatively small because it is based on the number of levels in the hierarchy rather than properties of the primitives or the number of primitives.

Note that, in some other implementations, bins may include links to primitive information in other bins, which may simplify accessing the primitives for rasterization. For example, in a linked implementation of FIG. 4, bin 1 might list the following: *A→*B→*D→E, where "*" denotes a pointer to the information for the primitive (which would still actually be stored in bin 4). In implementations with links, graphics unit 150 could consider a single bin corresponding to a tile being rendered and retrieve primitive information from other bins using the pointers to find primitives (in contrast to searching through multiple bins in parallel, as discussed above). The memory requirements to store these links may be substantial, however, and remain proportional to the area of the primitive. Therefore, such links are not included in various embodiments discussed above, (such as the embodiment of FIG. 4) which may be referred to as "linkless."

Configurable Number of Levels in Hierarchy

In some embodiments, the number of MIP levels is configurable, e.g., by a user or a graphics driver or firmware. In some processing tasks, the higher-level MIPs may be used relatively rarely, only being needed for very large primitives. Therefore, in embodiments in which graphics unit 150 is configured to support up to N hierarchical levels, it may be configured to operate using only levels 0-M when M is less than N. If the number of levels is set to only use MIP 0, in these embodiments, performance may be effectively the same as a tile-based renderer that does not utilize hierarchical binning. The number of levels may be configured during manufacturing, by a graphics driver, by graphics firmware, by an operating system, by a user program, etc., as appropriate in various embodiments. Using a smaller number of levels may reduce processing requirements without significantly increasing memory requirements, e.g., because very few primitives will be large enough to cover almost the entire screen space.

In various embodiments, tiles and bins of various shapes may be implemented and any of various appropriate numbers of tiles/bins per screen may be used. Further, any appropriate number of hierarchical levels may be used to store primitive information. Still further, the relationship between bins at different levels may vary in different implementations (e.g., for a given level M, the number N of bins at level M that correspond to a bin at the next highest level may vary, in various embodiments). These characteristics, and various other implementation details of the disclosed embodiments are shown with particular configurations for illustrative purposes but are not intended to limit the scope of the present disclosure.

Exemplary Method

Figure 5:
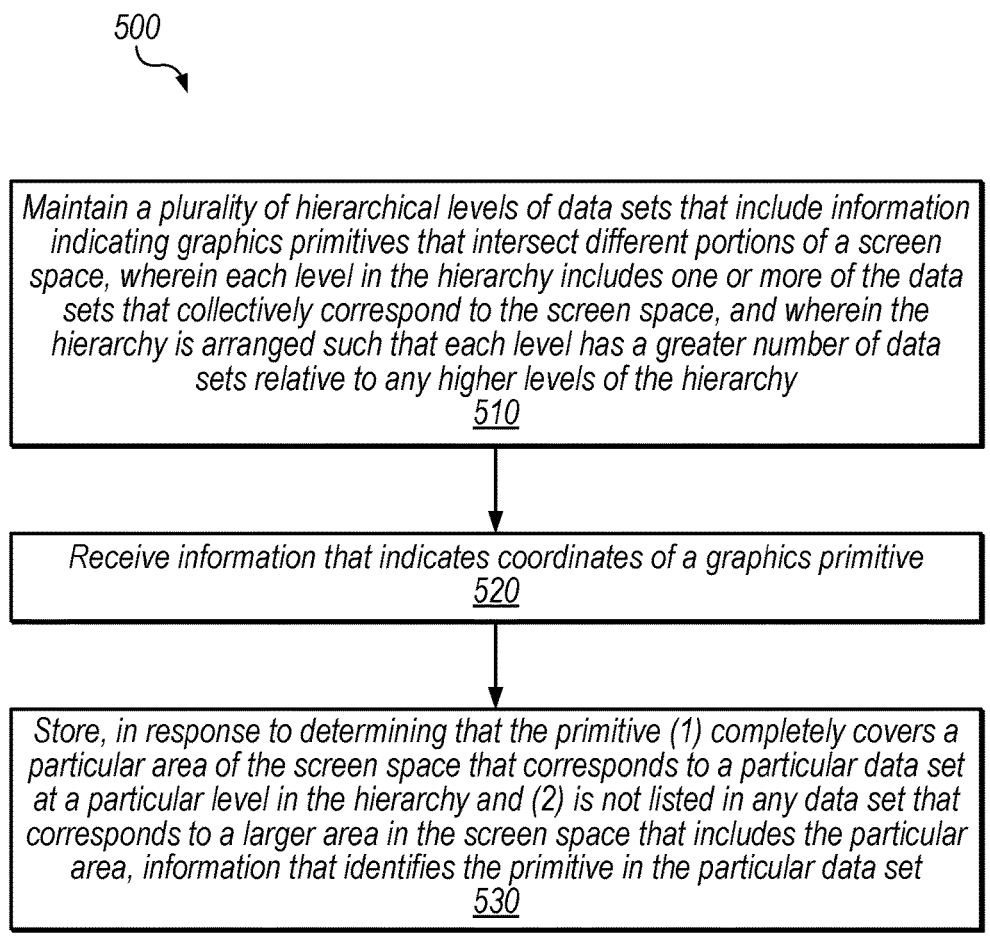
FIG. 5 is a flow diagram illustrating one embodiment of a method for hierarchically maintaining primitive information, according to some embodiments.
Figure 6:
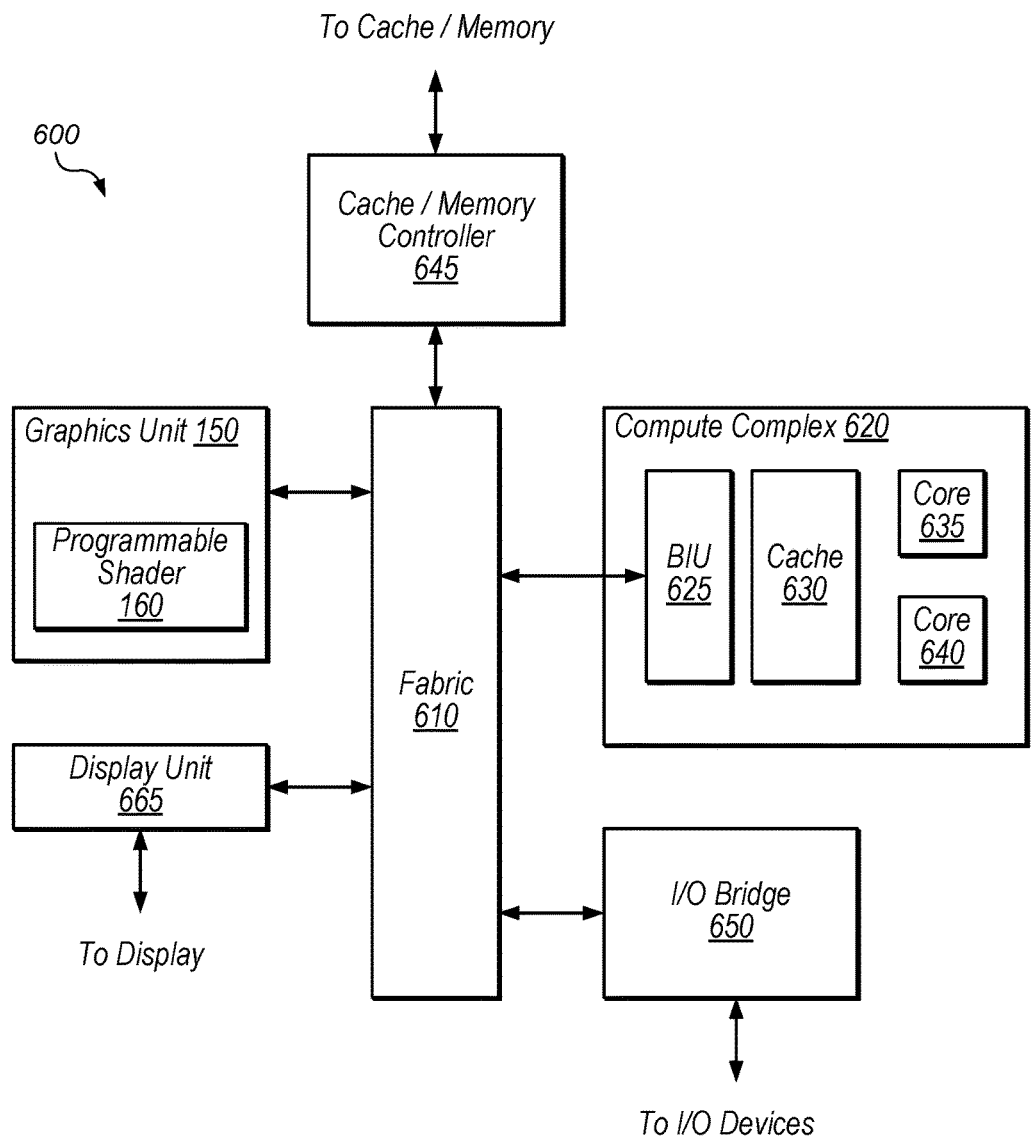
FIG. 6 is a block diagram illustrating an exemplary device that includes a graphics unit, according to some embodiments.

FIG. 5 is a flow diagram illustrating a method 500 for hierarchically maintaining primitive information, according to some embodiments. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Method 500 begins at 510.

At 510, in the illustrated embodiment, a graphics processor maintains a plurality of hierarchical levels of data sets that include information indicating graphics primitives that intersect different portions of a screen space. In the illustrated embodiment, each level in the hierarchy includes one or more of the plurality of data sets that collectively correspond to the screen space. In the illustrated embodiment, the hierarchy is arranged such that each level has a greater number of data sets relative to any higher levels of the hierarchy. The data sets may be initially empty for a given image to be rendered, e.g., until they are populated by the graphics processor based on received primitive information.

At 520, in the illustrated embodiment, the graphics processor receives information that indicates coordinates of a graphics primitive. The coordinates may be for vertices of the primitive, for example. The graphics processor, in some embodiments, is configured to determine what areas of the screen space are intersected and/or covered by the primitive based on the coordinates.

At 530, in the illustrated embodiment, the graphics processor stores information that identifies the primitive in a particular data set. In the illustrated embodiments, the graphics unit stores the information in response to determining that the primitive (1) completely covers a particular area of the screen space that corresponds to a particular data set at a particular level in the hierarchy and (2) is not listed in any data set that corresponds to a larger area in the screen space that includes the particular area.

In some embodiments, the graphics processor 150 stores the primitive in multiple data sets that meet the criteria. In some embodiments, the graphics processor begins at a highest level in the hierarchy and works down, so that criterion (2) can be determined based on whether a primitive was listed in higher bins. In some embodiments, the method 500 is performed for multiple primitives for a given image to be rendered. In some embodiments, after all the primitives have been listed, the graphics processor is configured to separately render portions (e.g., tiles) of an image where the portions correspond, in the screen space, to data sets at a particular level in the hierarchy.

In some embodiments, the method may include separately rasterizing portions of an image based on the data sets in the hierarchy. In some embodiments, e.g., when processing a given tile, the graphics processor is configured to determine primitives that intersect the tile by searching through all data sets in the hierarchy whose corresponding area of the screen space includes the tile. In some embodiments, the graphics processor is configured to iteratively select, from among these data sets, the primitive with the lowest primitive ID (or highest primitive ID, or according to any other appropriate ordering scheme, in various embodiments), until all primitives are processed, e.g., in order to maintain ordering of primitives. The portions of the screen space may be square or rectangular groups of pixels, for example.

In some embodiments, the method includes configuring the number of levels in the hierarchy of data sets based on a programmable setting. In some embodiments, the data sets are linkless, such that the data sets do not include pointers to primitive information for primitives that are not included in a given data set.

Exemplary Device

Referring now to FIG. 6, a block diagram illustrating an exemplary embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620, input/output (I/O) bridge 650, cache/memory controller 645, graphics unit 150, and display unit 665.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and/or caches. For example, compute complex 620 may include 1, 2, or 4 processor cores, or any other suitable number. In one embodiment, cache 630 is a set associative L2 cache. In some embodiments, cores 635 and/or 640 may include internal instruction and/or data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and/or memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 150 may be described as "coupled to" a memory through fabric 610 and cache/memory controller 645. In contrast, in the illustrated embodiment of FIG. 6, graphics unit 150 is "directly coupled" to fabric 610 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes programmable shader 160.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 650.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a plurality of storage locations configured to store information for a plurality of data bins, each of which corresponds to a portion of a screen space of a computer system;
    graphics processing circuitry configured to:
        access the plurality of storage locations to implement a hierarchy of levels arranged from a highest level to a lowest level, wherein each level in the hierarchy includes one or more of the plurality of data bins that collectively correspond to the screen space, and wherein the hierarchy is arranged such that each level has a greater number of data bins relative to any higher levels of the hierarchy;
        receive information that specifies coordinates of a set of primitives in the screen space; and
        determine and store, for data bins in multiple levels in the hierarchy of levels, information indicating those ones of the set of primitives that: (1) completely cover an area in the screen space corresponding to that data bin, and (2) are not included in any data bin in a higher level of the hierarchy, that at least partially overlaps in the screen with that data bin;
        wherein the stored information indicates at least one primitive of the set of primitives for data bins in multiple levels in the hierarchy of levels.

2. The apparatus of claim 1, further comprising circuitry configured to separately render portions of images, wherein the portions correspond, in the screen space, to data bins at a particular level in the hierarchy.

3. The apparatus of claim 2, wherein the portions correspond to the lowest level in the hierarchy.

4. The apparatus of claim 1, wherein, to determine primitives that intersect a particular portion of the screen space, the apparatus is configured to search through all data bins in the hierarchy whose corresponding area of the screen space includes the particular portion of the screen space.

5. The apparatus of claim 4, wherein the apparatus is configured to iteratively process the primitive with the smallest primitive identifier from among remaining primitives in the data bins in the hierarchy whose corresponding area of the screen space includes the particular portion of the screen space, wherein the processing includes determining pixel attributes for display based on the primitives.

6. The apparatus of claim 1, wherein the graphics processing circuitry is further configured to determine and store, for one or more data bins at the lowest level in the hierarchy, information indicating a set of primitives that (1) intersect the data bin's corresponding particular area in the screen space and (2) are not included in any data bin that corresponds to a larger area in the screen space that includes the particular area.

7. The apparatus of claim 1, wherein the apparatus is configured to perform tile-based deferred rendering.

8. The apparatus of claim 1, wherein the portions of the screen space correspond to rectangular sets of pixels in the screen space.

9. The apparatus of claim 1, wherein the number of levels of data structures in the hierarchy in which the circuitry is configured to store information indicating primitives is based on a programmable parameter.

10. A method, comprising:
maintaining, in one or more storage elements, multiple hierarchical levels of data sets, wherein the data sets include information indicating graphics primitives that intersect different portions of a screen space, wherein each level in the hierarchy includes one or more of the data sets that collectively correspond to the screen space, and wherein the hierarchy is arranged such that each level has a greater number of data sets relative to any higher levels of the hierarchy;
receiving information that specifies coordinates of primitives in the screen space; and
determining and storing, for data sets in each of multiple levels of the hierarchy, information indicating a set of primitives that: (1) completely cover the data set's corresponding particular area in the screen space and (2) are not included in any data set that corresponds to a larger area in the screen space that includes the particular area;
wherein the stored information indicates at least one primitive of the set of primitives for data bins in multiple levels in the hierarchy of levels.

11. The method of claim 10, further comprising:
separately rasterizing portions of an image for display, wherein the portions correspond, in the screen space, to data sets at a particular level in the hierarchy.

12. The method of claim 10, further comprising:
determining primitives that intersect a particular portion of the screen space by searching through all data sets in the hierarchy whose corresponding area of the screen space includes the particular portion of the screen space.

13. The method of claim 10, further comprising:
determining and storing, for one or more data sets at the lowest level in the hierarchy, information indicating a set of primitives that (1) intersect the data set's corresponding particular area in the screen space and (2) are not included in any bin that corresponds to a larger area in the screen space that includes the particular area.

14. The method of claim 10, wherein the portions of the screen space correspond to rectangular sets of pixels in the screen space.

15. The method of claim 10, wherein the data sets do not include pointers to primitive information for primitives that are not included in a given data set.

16. The method of claim 10, further comprising:
determining, based on a programmable parameter, the number of levels of data structures in the hierarchy in which to store information indicating primitives.

17. A graphics unit configured to perform tile-based deferred rendering, comprising:
one or more storage elements configured to maintain multiple hierarchical levels of bins, wherein the bins include information indicating graphics primitives that intersect different portions of a screen space, wherein bins at each level in the hierarchy, other than a lowest level, correspond to respective portions of the screen space that each correspond to multiple different bins at a lower level in the hierarchy;
circuitry configured to:
receive information that specifies coordinates of primitives in the screen space; and
determine and store, for bins in each of multiple levels of the hierarchy, information indicating a set of primitives that: (1) completely cover the bin's corresponding particular area in the screen space and (2) are not included in any bin that corresponds to a larger area in the screen space that includes the particular area;
wherein the stored information indicates at least one primitive of the set of primitives for bins in multiple levels in the hierarchy of levels.

18. The graphics unit of claim 17, wherein the circuitry is further configured to determine and store, for one or more bins at the lowest level in the hierarchy, information indicating a set of primitives that (1) intersect the bin's corresponding particular area in the screen space and (2) are not included in any bin that corresponds to a larger area in the screen space that includes the particular area.

19. The graphics unit of claim 17, wherein the graphics unit is configured to maintain a primitive identifier for each primitive and is configured, when rendering a tile, to iteratively process the primitive with the smallest primitive identifier from among remaining primitives in the bins in the hierarchy whose corresponding area of the screen space includes the tile.

20. The graphics unit of claim 17, wherein the number of levels of bins in the hierarchy is based on a programmable parameter.

* * * * *